(12) United States Patent
Nikinmaa et al.

(10) Patent No.: US 12,521,436 B2
(45) Date of Patent: Jan. 13, 2026

(54) METHOD AND KIT FOR TREATING SKIN INFECTIONS

(71) Applicant: Koite Health Oy, Espoo (FI)

(72) Inventors: Sakari Nikinmaa, Espoo (FI); Juha Rantala, Espoo (FI); Tommi Pätilä, Espoo (FI)

(73) Assignee: Koite Health Oy, Espoo (FI)

( * ) Notice: Subject to any disclaimer, the term of this patent is extended or adjusted under 35 U.S.C. 154(b) by 601 days.

(21) Appl. No.: 17/802,978

(22) PCT Filed: Mar. 1, 2021

(86) PCT No.: PCT/FI2021/050147
§ 371 (c)(1),
(2) Date: Aug. 29, 2022

(87) PCT Pub. No.: WO2021/170915
PCT Pub. Date: Sep. 2, 2021

(65) Prior Publication Data
US 2023/0149545 A1    May 18, 2023

(30) Foreign Application Priority Data
Feb. 27, 2020   (FI) ..................................... 20205206

(51) Int. Cl.
*A61K 41/00*   (2020.01)
*A61N 5/06*    (2006.01)

(52) U.S. Cl.
CPC .......... *A61K 41/0057* (2013.01); *A61N 5/062* (2013.01); *A61N 5/0624* (2013.01);
(Continued)

(58) Field of Classification Search
None
See application file for complete search history.

(56) References Cited

U.S. PATENT DOCUMENTS 12,161,719 B2 * 12/2024 Pätilä ................. A61K 49/0034
12,263,349 B2 *  4/2025 Nikinmaa .......... A61K 41/0057
(Continued)

FOREIGN PATENT DOCUMENTS

CN      1771073 A        5/2006
WO   WO2014131115 A1    9/2014
(Continued)

OTHER PUBLICATIONS

Kaya, Göksel Şimşek et al. ("The use of 808-nm light therapy to treat experimental chronic osteomyelitis induced in rats by methicillin-resistant *Staphylococcus aureus*." Photomedicine and laser surgery vol. 29,6 (2011): 405-12. doi: 10.1089/pho.2010.2807) (Year: 2011).*
(Continued)

*Primary Examiner* — Erica S Lee
(74) *Attorney, Agent, or Firm* — Laine IP Oy; Mark W. Scott

(57) ABSTRACT

Method and kit for topical treatment of a skin infection, in particular of superficial skin infections, caused by *Staphylococcus aureus*. The method comprises the steps of applying a photosensitizer to at least a part of the skin affected by the infection, and subjecting said part of the skin to first photons with a majority energy between 2.8 eV and 3.5 eV at a first energy level; and second photons with a majority energy between 1.24 eV and 1.65 eV at a second energy level, the ratio between the first and the second energy levels being in the range from about 10:1 to 2:1. By the method efficient treatment of *Staphylococcus aureus* infections can be achieved without the administration of topical antibiotics.

19 Claims, 1 Drawing Sheet

(52) U.S. Cl.
CPC ............... *A61N 2005/0651* (2013.01); *A61N 2005/0662* (2013.01)

(56) References Cited

U.S. PATENT DOCUMENTS

| | | | |
|---|---|---|---|
| 2002/0165594 | A1 | 11/2002 | Biel |
| 2004/0193235 | A1* | 9/2004 | Altshuler ............ A61N 5/0603 607/88 |
| 2018/0311507 | A1 | 11/2018 | Barolet |
| 2020/0054893 | A1 | 2/2020 | Yoon et al. |
| 2021/0030874 | A1* | 2/2021 | Pätilä ..................... A61P 31/12 |

FOREIGN PATENT DOCUMENTS

| | | | |
|---|---|---|---|
| WO | WO2019092215 | A1 | 5/2019 |
| WO | WO2020036436 | A1 | 2/2020 |
| WO | WO2020084199 | A1 | 4/2020 |
| WO | WO2020193870 | A1 | 10/2020 |
| WO | WO2021023915 | A1 | 2/2021 |

OTHER PUBLICATIONS

Ghorbani et al: Photosensitizers in antibacterial photodynamic therapy: An overview. Laser Therapy, Dec. 31, 2018, pp. 293-302.

Bumah et al: Wavelength and Bacterial Density Influence the Bactericidal Effect of Blue Light on Methicillin-Resistant *Staphylococcus aureus* (MRSA) Photomedicine and Laser Surgery, Nov. 1, 2013, vol. 31, No. 11, pp. 547-553.

Gueffey et al: Effects of Combined 405-nm and 880-nm Light on *Staphylococcus aureus* and Pseudomonas aeruginosa in Vitro. Photomedicine and Laser Surgery, 2006. Vol. 24, No. 6, pp. 680-683.

Nielsen et al: Choice of Optimal Wavelength for PDT: The Significance of Oxygen Depletion. Photochemistry and Photobiology, Jan. 1, 2005, vol. 81, No. 5, p. 1190.

Nikinmaa et al: Dual-light photodynamic therapy administered daily provides a sustained antibacterial effect on biofilm and prevents *Streptococcus mutans* adaptation. bioRxiv, Jan. 9, 2020.

Omar et al: Lethal photosensitization of wound-associated microbes using indocyanine green and near-infrared light. BMC Microbiology, Jul. 1, 2008, vol. 8, No. 111.

Topaloglu et al: Antimicrobial Photodynamic Therapy of Resistant Bacterial Strains by Indocyanine Green and 809-nm Diode Laser. Photomedicine Ano Laser Surgery, Apr. 1, 2013, vol. 31, No. 4, pp. 155-162.

Wong et al: Photodynamic inactivation of methicillin-resistant *Staphylococcus aureus* by indocyanine green and near infrared light. Dermatologica Sinica, Mar. 1, 2018, vol. 36, No. 1, pp. 8-15.

Bumah et al: Optimization of the Antimicrobial Effect of Blue Light on Methicillin-Resistant *Staphylococcus aureus* (MRSA) in Vitro. Lasers Surg Med, 47(3), p. 266-272, Mar. 2015.

Giannelli et al: Appropriate laser wavelengths for photodynamic therapy with methylene blue. Lasers in Medical Science, Jun. 30, 2018, vol. 33, No. 8, pp. 1837-1838.

Tao: In Vitro Study on the Effect of Curcumin-Mediated Photodynamic Therapy against Methicillin-Resistant *Staphylococcus aureus* and Its Biofilm. Wanfang Data, Jan. 15, 2020, vol. 1, pp. I-11.

* cited by examiner

METHOD AND KIT FOR TREATING SKIN INFECTIONS

FIELD OF INVENTION

The present invention relates to treatment of infections, in particular skin infections. More specifically, the invention concerns a method and a kit for treating skin infections, for example superficial skin infections, caused by bacteria of the *Staphylococcus* genus. The invention also concerns a novel use of photosensitizers.

BACKGROUND

*Staphylococcus* is a genus of Gram-positive bacteria in the family Staphylococcaceae in the order Bacillales. Despite being part of the generally harmless skin microbial flora, *Staphylococcus aureus* is the most dangerous of all of the staphylococcal bacteria. Skin infections are common, but the bacteria can enter the blood stream, causing potentially lethal infections. *Staphylococcus aureus* is the leading cause of infectious endocarditis and *S. aureus* bacteraemia carries a high mortality risk, with little change in mortality during history. Twenty to 60% of people are colonized by the bacteria.

Impetigo, a contagious bacterial skin disease which forms pustules and yellow crusty sores, chiefly on the face and hands, is an example of a common and generally harmless skin infection caused by bacteria of the *Staphylococcus aureus* or, in some cases, *Streptococcus pyogenes*, species. So far, Impetigo has been treated by topical application of antibiotics, such as bacitracin, often combined with netilmicin. However, allergic reactions as well as resistance formation has been proven to be a large scale problem with these antibiotics.

Resistance to antibiotics is, in fact, now considered one of the biggest threats in modern medicine. With the appearance of meticillin resistant *Staphylococcus aureus* (MRSA) species, new methods to reduce excessive antibiotic use, as well as means to fight resistant bacteria are urgently needed, not the least with regard to Impetigo and other superficial skin infections involving bacteria of the *Staphylococcus* family and in particular the *Staphylococcus aureus* species.

SUMMARY OF THE INVENTION

It is an aim of the present invention to provide a method of treating infections caused by bacteria of the *Staphylococcus* genus, and in particular of the *Staphylococcus aureus* species.

It is another aim of the present invention to provide a kit for treating infections caused by bacteria of the *Staphylococcus* genus, and in particular of the *Staphylococcus aureus* species.

It is a third aim of the present invention to provide a novel use of photosensitizers in treatment of infections caused by bacteria of the *Staphylococcus* genus, and in particular of the *Staphylococcus aureus* species.

It is a fourth aim of the present invention to provide for treatment of *Staphylococcus* skin infections without the use of antibiotics.

The present invention is based on the finding that dual-light photodynamic therapy, i.e. photodynamic therapy carried out simultaneously using also a second wavelength, is effective against streptococcal bacteria based on the lack of catalase enzyme.

More specifically it has been found that combined antibacterial photodynamic therapy (aPDT) and antibacterial blue light (aBL) is effective against *streptococcus* biofilm, using a photosensitizer, in particular indocyanine green.

Thus, the present invention provides a method of treating infections, in particular skin infections, such as superficial skin infections, caused by *Staphylococcus aureus* in which a photosensitizer is applied to at least a portion of the skin which is affected by the infection. The photosensitizer applied onto the skin is then subjected to first, high-energy photons and second, low-energy photons. The ratio between the energy levels of the first and the second photons is preferably 10:1 to 2:1.

The present invention also provides a sensitizer for use in the topical treatment of infections, in particular skin infections, such as superficial skin infections, caused by *Staphylococcus aureus* on a mammal, which sensitizer is applied to at least a part of the skin affected by the infection. The part thus treated is subsequently or simultaneously subjected to first photons with a majority energy between 2.8 eV and 3.5 eV, at a first energy level; and second photons having a majority energy between 1.24 eV and 1.65 eV, at a second energy level, the ratio between the first and the second energy levels being in the range from about 10:1 to 2:1. In particular the ratio is about 3:1.

A kit for topical treatment of skin infections, such as superficial skin infections, caused by *Staphylococcus aureus* on a mammal, comprises an optoelectronic device capable of and adapted to simultaneously emitting a first light consisting of high energy photons at a first energy level, and a second light consisting of low energy photons at a second energy level, the ratio between the first and the second energy levels being in the range from about 10:1 to 2:1. The kit further comprises at least one photosensitizer which can be applied on a part of the skin affected by the superficial skin infection and activated by either or both of the high energy and low energy photons.

More specifically, the present invention is mainly characterized by what is stated in the characterizing parts of the independent claims.

Considerable advantages can be obtained with the invention.

Thus, the present invention provides an efficient treatment of *Staphylococcus aureus* infections without, in particular entirely without, —and independently of—the administration of topical antibiotics. As stated above, antimicrobial resistance is the most important threat to modern medicine, and *Staphylococcus aureus* is notorious for its ability to become resistant to antibiotics. Inappropriate antibiotic use is one of the major reasons for antimicrobial resistance formation. This can be avoided by the present invention.

As a result, the treatment can be repeated an unlimited number of times without giving rise to antimicrobial resistance.

In preferred embodiments, the treatment is carried out primarily topically using non-allergic photosensitizers and by using non-coherent light, for example by using LEDs, which means that the wound area is protected against heating and burns as well as against allergic reactions.

Although the topical treatment is, as such, preferably carried out entirely without the administration of topical antibiotics, the present treatment can be combined with antiseptic topical agents.

In embodiments, the present treatment can also be combined with the use of antibiotics, such as systemic antibiotics, in particular if the treatment is initiated only at a point of time when there can be a risk of bacteria having entered the blood stream before the treatment.

The treatment can be carried out on *Staphylococcus aureus* infections of superficial skin tissues, for example for or during treatment of Impetigo, as well as infections of superficial skin, skin tissues, artificial skin, prosthetics, and body fluids exposed during a surgical procedure.

The treatment can be carried out on infections generally caused by *Staphylococcus aureus* strains, including infections caused by methicillin resistant *Staphylococcus aureus* (MRSA).

The treatment can be carried out generally on mammals, including humans and animals.

Next, embodiments will be examined with the aid of a detailed description and experimental results.

EMBODIMENTS

Definitions

Figure 1:
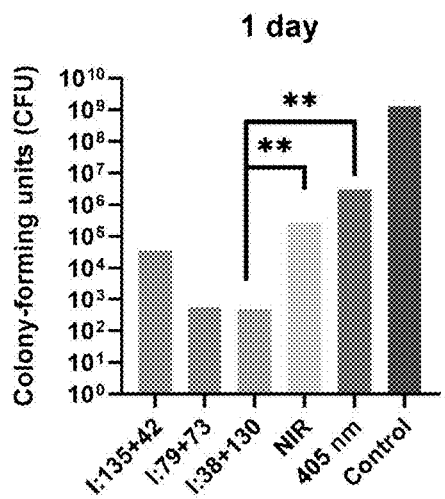
FIG. 1 is a bar chart showing the efficiency of various light treatments on *Staphylococcus aureus* growth medium suspensions in terms of the count of colony-forming units after a one-day treatment with single-dose light exposure.

In the present context, "photodynamic therapy", also referred to by the abbreviation "PDT", stands for any therapy where light is converted to some form of reactive oxygen. Examples of reactive oxygen includes singlet oxygen, oxygen radicals and oxygen ions.

"Antimicrobial photodynamic therapy", also referred to by the abbreviation "aPDT", is a photochemistry-based method that uses photons to activate "sensitizers" that, in the activated state, impart antimicrobial, in particular antibacterial, effect.

"Antimicrobial blue light", also referred to by the abbreviation "aBL", is light, typically in the wave length area of 400 nm to 470 nm, such as 400 nm to 430 nm or 405 to 470 nm, or 405 to 430 nm, or about 405 nm, that exhibits for example intrinsic antimicrobial effect without the involvement of exogenous photosensitizers.

"Photosensitizers" are compounds or molecules that are capable of absorbing electromagnetic radiation for example in the ultraviolet or visible region and transferring it to adjacent molecules. Typically, the photosensitizers have de-localized 7C systems.

Although the term "photosensitizer" at instances is used in the singular voice in the present context, the term also comprises several compounds or molecules. In particular, it comprises mixtures or sequential use of two or more photosensitizer compounds or molecules. In case of using a plurality of photosensitizer compounds or molecules, at least one is suitable for use with high energy photons and at least one is suitable for use with low energy photons.

In one embodiment, one photosensitizer selected is capable of achieving endogenous antimicrobial action in combination with the corresponding light, and one photosensitizer is selected which is capable of achieving exogenous antimicrobial action in combination with the corresponding light.

The photosensitizers can be naturally occurring compounds ("natural photosensitizers") and synthetic compounds. Indocyanine Green is a particularly preferred photosensitizer.

"Non-coherent" when used in connection to light means that the amplitude and phase of the emitted light waves fluctuate randomly in space and time. One embodiment comprises using LEDs as non-coherent light sources. Another embodiment comprises using UVC lamps as non-coherent light sources.

"High energy photons" are photons with energy in the range from 3.5 eV to 2.8 eV, in particular about 3.2 to 2.9 eV or 3.17 to 2.95 eV. Typically, such photons are contained in light having a wavelength in the range of about 350-450 nm, for example about 380 to 430 nm, such as 390 to 410 nm, or about 405 nm.

"Low energy photons" are photons with energy in the range from 1.24 eV to 2.48 eV, in particular 1.3 to 2.4 eV, for example 1.4 to 1.6 eV or 1.45 to 1.56 eV. Typically, such photons are contained in light having a wavelength in the range of about 500 to 1000 nm, for example about 780 to 830 nm, for example about 810 nm.

Light with photons having "a majority energy in the range from 3.5 eV to 2.8 eV" stands for light, for example in the form of a light beam or light ray, in which at least 50%, in particular at least 60% or at least 70% or at least 80% or at least 90% or at least 95%, of the photons—as indicated by their energy—have an energy in the range from 3.5 eV to 2.8 eV, or 3.2 eV to 2.9 eV, such as 3.17 to 2.95 eV.

Light with photons having "a majority energy in the range from 1.24 eV to 2.48 eV" stands for light, for example in the form of a light beam or light ray, in which at least 50%, in particular at least 60% or at least 70% or at least 80% or at least 90% or at least 95%, of the photons—as indicated by their energy (or wavelength)—have an energy in the range from 1.24 eV to 2.48 eV or 1.3 eV to 2.4 eV, such as 1.4 to 1.6 eV or 1.45 to 1.56 eV.

Generally, the term "majority energy" means that more than 50%, in particular more than 60%, for example more than 70% or more than 80% of the energy of the light lies in the indicated range.

Generally speaking, it has been found that dosing, in particular simultaneously, dosing of both high and low energy photons, in particular together with a low energy photon activated photosensitizer, increases the antibacterial effect of light compared to dosing of either group of photons separately.

A first embodiment comprises a method of treating skin infections caused by *Staphylococcus aureus* comprising the steps of applying a photosensitizer to at least a part—preferably a majority, or all—of the skin affected by the infection, and subjecting said part of the skin to first photons with a majority energy between 2.8 eV and 3.5 eV, at a first energy level; and second photons with a majority energy between 1.24 eV and 1.65 eV, at a second energy level.

As will appear from the experimental data given below, dual-light aPDT is efficient against *Staphylococcus aureus* biofilm. The simultaneous, synchronized application of a photosensitizer, such as ICG combined with low-energy light (e.g. about 810 nm light, i.e. aPDT) and about 405-nm aBL, i.e. high-energy light results in a significantly improved antibacterial efficacy, when compared to single-light aPDT or aBL. Interestingly, the antibacterial effect was greatest, when the relative amount of aBL was increased to two thirds or more of the total amount of light irradiance.

Thus, in one embodiment, the ratio between the first and the second energy levels is in the range from about 10:1 to 2:1, in particular from about 5:0.7 to 3.5:0.8, for example 3.1:0.9, such as about 3:1.

In one embodiment, during the application of the photosensitizer, at least 50%, in particular at least 60%, for example at least 70%, such as at least 80%, preferably at least 90% of the infected area is covered with the photosensitizer. The photosensitizer can be applied onto the whole infected area and further such that at least some of the non-infected area adjacent to the infected area is covered as well.

In a first embodiment, the present technology provides for a method and kit of treating biological surfaces with electromagnetic radiation in the form of light of two different energy levels, a first light with photons having a majority energy in the range from 3.5 eV to 2.8 eV and a second light with photons having a majority energy in the range from 1.24 eV to 2.48 eV.

The treatment is carried out by simultaneously directing the photons of the first light and the second light against the part of the skin affected by the bacterial infection.

In one embodiment the photons have at least 50% of their energy at 3.17 eV to 2.95 eV and 1.56 eV to 1.45 eV, respectively. In one embodiment, the photons have at least 50% of their energy in a range corresponding to the wavelength of about 390 to 420 nm and 795 to 855 nm, respectively, for example about 405 nm and 810 nm, respectively.

In one preferred embodiment, the light employed is non-coherent. Such light is in particular obtained by using Light Emitting Diodes (LEDs).

In one embodiment,
non-coherent radiant light energy is generated at least two different energy levels, a first and a second energy level;
from the non-coherent radiant light energy there is provided first light having a wavelength corresponding to the majority energy of the first energy level, and second light having a wavelength corresponding to the majority energy of the second energy level; and
the first and second light is then simultaneously directed against the part of the skin which has been treated with the photosensitizer and affected by the bacterial infection.

In one embodiment, the light is generated using an optoelectronic component and device thereof (in particular in a kit), which is capable of and, thus, adapted to simultaneously emitting a first light consisting of high energy and a second light consisting of low energy photons, said first and said second light amounting to at least 80% of all light emitted from the optoelectronic component or device.

In one embodiment, a method according to any of the above embodiments is carried out using an anti-microbial optoelectronic component and device thereof, such as an LED light source, by simultaneously emitting high energy photons absorbed by endogenous molecules and low energy photons absorbed by exogenous molecules.

In the method, the sensitizer for use in the topical treatment of a superficial skin infection caused by *Staphylococcus aureus* is applied to a part of skin affected by the infection, and that part is subsequently or simultaneously subjected to first photons with a majority energy between 2.8 eV and 3.5 eV at a first energy level; and second photons with a majority energy between 1.24 eV and 1.65 eV at a second energy level, the ratio between the first and the second energy levels being in the range from about 10:1 to 2:1.

In one embodiment, the ratio between the first and the second energy levels is 5:0.8 to 3.5:0.9.

The sensitizer can be selected from the group of natural compounds comprising hypericin, curcumin, phenalenone derivatives, Cercosporin, psoralen, xanthotoxin, Angelicin, alpha-Terthienyl, Phenylthepatriyne, THC, Cannabidiol (CBD) and combinations thereof, and the group of synthetic photosensitizers comprising RB (Rose Bengal), MB, Porphyrin derivatives, Curcumin derivatives, Methylene Blue, Indocyanine Green, Erythrosine, Phenalenone derivatives, Fullerene derivatives, Xanthene derivates, resveratrol, berry extracts, such as lingonberry and blueberry including polyphenolic compounds and/or anthocyanin compounds and combinations thereof, or the photosensitizer is a the combination of at least one photosensitizer is selected from the group of natural compounds listed above and at least one photosensitizer is selected from the group of synthetic compounds listed above.

In one embodiment, the sensitizer used in the topical treatment of an infection is Indocyanine Green.

The sensitizer for use in the topical treatment is subjected to light energy, in particular non-coherent radiant light energy, at a first wavelength from 400 to 430 nm at first power density, and at a second wavelength from 780 to 830 nm at a second power density, the ratio of the power density of the light energy of the first wavelength to the power density of the light energy of the second wavelength being 5:0.8 to 3.5:0.9, in particular about 3:1.

In one embodiment, the non-coherent radiant light energy has a first wavelength of 400 to 430 nm, for example 405 nm, preferably at a dosage of 1 to 750 $J/cm^2$, for example 5 to 600 $J/cm^2$, in particular 10 to 250 $J/cm^2$ and preferably a power density of from about 10 to about 2500 $mW/cm^2$. The radiant light energy has further a second wavelength of 780 to 830 nm, for example 810 nm, preferably at a dosage of 1 to 750 $J/cm^2$, for example 5 to 600 $J/cm^2$, in particular 10 to 250 $J/cm^2$ and a power density of from about 10 to about 2500 $mW/cm^2$.

In one embodiment, the dosage of the radiant light energy having a first and a second wavelength, respectively, is in the range of 1 to 600 $J/cm^2$ (for each light).

In one embodiment, the dosage of the radiant light energy having a first and a second wavelength, respectively, is in the range of 1 to 120 $J/cm^2$ (for each light).

In one embodiment, the dosage of the radiant light energy having a first and a second wavelength, respectively, is in the range of 1 to 10 $J/cm^2$ (for each light) to achieve a bacteriostatic effect.

In one embodiment, the dosage of the radiant light energy having a first and a second wavelength, respectively, is in the range of more than 120 $J/cm^2$ and up to about 250 $J/cm^2$ (for each light).

The topical treatment of a skin infection caused by *Staphylococcus aureus* is generally carried out, non-intermittently, for a period of time from 0.5 s to 120 min.

In one embodiment, the topical treatment, which preferably has a duration of 0.5 s to 120 min, is carried out 1 to 5 times a day, for 1 to 14 days, in particular 1 to 7 days.

In one embodiment, the topical treatment, which preferably has a duration of 0.5 s to 120 min, is repeated 2 to 50 times during 1 to 14 days. In one embodiment, the topical treatment is repeated 2 to 25 times during 1 to 7 days.

The photo-sensitizer is typically applied, for example in liquid form or as a gel, in amounts of about 0.01 mg/ml to 10 g/ml, for example 0.1 mg/ml to 1 g/ml.

In some embodiments, the photo-sensitizer is applied to the superficial skin infection at 0.0001% (w/v) to 1% (w/v).

In an embodiment, a kit for topical treatment of a superficial skin infection caused by *Staphylococcus aureus* on a mammal, comprises an optoelectronic device capable of (and adapted to) simultaneously emitting a first light consisting of high energy photons at a first energy level, a second light consisting of low energy photons at a second energy level, the ratio between the first and the second energy levels being in the range from about 10:1 to 2:1, for example 5:0.8 to 3.5:0.9, in particular about 3:1, and at least one photosensitizer which can be activated by at least either of the high energy and low energy photons.

One embodiment provides a kit with an optoelectronic device is capable of (and adapted to) emitting light, in particular non-coherent light, comprising
  first photons with a majority energy between 2.8 eV and 3.5 eV at a first energy level, or at a first wavelength from 400 to 430 nm, at a dosage of 1 to 750 J/cm$^2$, and a power density of from about 10 to about 2500 mW/cm$^2$ for a period of time from 0.5 s to 120 min, and
  second photons with a majority energy between 1.24 eV and 1.65 eV at a second energy level, or at a second wavelength from 780 to 830 nm, at a dosage of 1 to 750 J/cm$^2$, and with a power density of from about 10 to about 2500 mW/cm$^2$ for a period of time from 0.5 s to 120 min.

In one embodiment, a kit comprising an optoelectronic device is adapted to emitting two wavelengths simultaneously or at a time interval of 0.001 to 1000 ms, for example 0.1 to 500 ms or 10 to 250 ms, such as about 100 ms, from each other, together with a photosensitizer or a plurality of photosensitizers, and it is typically adapted to carrying out a method of topical treatment of a skin infection on the skin of a mammal caused by *Staphylococcus aureus*.

Dual-light aPDT is effective against *Staphylococcus aureus* biofilm and provides a sustained effect. Increase in the relative ratio of aBL strengthens the antibacterial effect, especially when treatment is repeatedly applied. Dual-light aPDT therefore provides effective treatment of *Staphylococcus aureus* infections and eliminates the need for use of antibiotics in topical antibacterial applications.

In one embodiment, the *Staphylococcus aureus* infection comprises infections on the skin, such as superficial skin infections, for example Impetigo. Also abscesses can be treated.

In one embodiment, the *Staphylococcus aureus* infection comprises an infection of tissues, such as organ tissues, superficial skin, skin tissues and body fluids during a medical procedure, such as tissues, organs, prosthetics and body fluids exposed during a medical procedure, such as a surgical procedure. One embodiment comprises treatment of infected organ tissues of, for example, joints, heart and lung. One embodiment comprises treatment of prosthetic parts or artificial parts, such as prosthetics, for example heart valves or prosthetic joints, or artificial skin, as well as adjacent tissue and body fluids, exhibiting infections.

In one embodiment, biofilms exhibiting *Staphylococcus aureus* infections are treated.

The above embodiments can be carried out on humans as well as on animals.

The following examples illustrate embodiments.

Materials and Methods

Monospecies *S. aureus* biofilm model experiments were performed to study the effect of single, or recurring application of dual-light aPDT or its parts during the biofilm formation process. Flat-bottom Nunclon Delta well plates (Thermo Fisher Scientific Inc, US), were used, and the biofilm experiments were divided into different setups based on maturation age and the therapy given.

Study Protocols

Applications of both single- and dual-light therapies were scheduled to mimic the daily use of antibacterial light therapy. The total amount of light irradiance as kept unchanged in different treatment protocols, and the concentration of the ICG photosensitizer (if given) were identical. In the first setting, *S. aureus* biofilm was incubated for either one day or three days, and a single dose of light with ICG was applied at the end of the growth period.

In the second setting, the biofilm was incubated for either three days or six days, and a daily dose of light ICG with was applied during incubation. In each setting, the last treatment was followed by plating onto brain heart infusion (BHI)-agar dishes for colony-forming unit (CFU) counting.

Biofilm Model

*Staphylococcus aureus* bacteria were grown for 18 h in an incubator (NuAire DH autoflow 5500, NuAire inc, US), at +36 degrees C., 5% $CO_2$ in BHI broth (Bio-Rad 3564014, Bio-Rad Laboratories, Inc, US). The resulting bacterial suspension was diluted with a 0.9% NaCl solution until an optical density (OD) of 0.46 was reached. The optical density was measured by a spectrophotometer (Varian Cary 100 Bio UV-VIS, Agilent Technologies, Inc, US), and then with a Den 1 McFarland Densitometer (Biosan, Riga, Latvia).

Biofilms were grown in flat-bottom 96-well plates (Thermo Fisher Scientific Inc, US) by placing 100 μl of 0.46 OD *S. aureus* suspension in each well, with 100 μl of BHI-broth growth medium. The well plates were then incubated in a growth chamber (36° C., 5% $CO^2$). The BHI-broth medium was changed daily to supply fresh growth medium and to wash away the debris. The change of the medium in each well was performed by removing 100 μl of the medium and replacing it with a similar amount of fresh BHI broth.

Light Exposure

Before the light exposure took place, the growth medium was meticulously removed by pipetting and subsequently replaced with an equal amount of indocyanine green solution (Verdye, Diagnostic Green, GmBH), tittered to a concentration of 250 μg/ml. The indocyanine green was left to incubate at room temperature and in the dark for 10 minutes. After this incubation period, the biofilm was washed with a 0.9% NaCl solution. Then, the 0.9% solution of NaCl was added to each well to reach a total volume of 200 μl.

Light exposure was performed using specific, custommade LED light sources (Lumichip Oy, Espoo, Finland). The exposure time was calculated from the determined light amount and known irradiances, which had been previously measured with a light energy meter (Thorlabs PM 100D with S121C sensor head, Thorlabs Inc, US) and a spectroradiometer (BTS256, Gigahertz-Optik GmbH, Germany), respectively. After the exposure, the BHI broth was changed and the plates were placed in the incubator, or, if the light exposure was final, the biofilm was scraped for CFU counting, as described below. Excitation lights were applied with two single-wave LED light sources with peak intensities at 810 nm or at 405 nm, and with a dual-wave LED light chip simultaneously producing two separate peak intensities at 405 nm and at 810 nm.

Antibacterial photodynamic therapy light exposure was administered at an 810-nm peak wavelength LED array on top of the well plate. The resulting light irradiance was 100 mW/cm$^2$, and the provided light energy was 100 J/cm$^2$. Antibacterial blue light was administered at a 405-nm peak wavelength LED array, with a resulting irradiance of 80 mW/cm$^2$, and resulting light energy of 100 J/cm$^2$. The dual light was administered with two light peaks identically placed and providing LED arrays on top of the well plate, producing a synchronous irradiance of 50 mW/cm$^2$ for the 405-nm light, and 50 mW/cm$^2$ for the 810-nm light. The light energies produced were 50 J/cm$^2$ (405 nm) and 50 J/cm$^2$ (810 nm), respectively. To rule out an LED well-heating effect on bacterial viability, temperature controls were measured (Omega HH41 Digital Thermometer, Omega Engineering, US) in the biofilm wells to confirm temperature levels below 35 degrees during the treatment, with a 100 mW/cm$^2$ radiant flux.

The antibacterial efficacy of dual-light treatment was also tested in terms of the relative amounts of 810-nm and 405-nm light irradiance. Three different light combinations were employed, with a simultaneous use of the single-peak-emitting light sources. Firstly, a 1:1 irradiance ratio of aBL to aPDT was applied, with 70 mW/cm$^2$ irradiance for the 405-nm light and 70 mW/cm$^2$ for the 810-nm light, the light energy emitted being at 50 J/cm$^2$ and at 50 J/cm$^2$, respectively. Secondly, a 3:1 irradiance ratio of aBL to aPDT was applied, with 130 mW/cm$^2$ irradiance for the 405 nm light and 40 mW/cm$^2$ for the 810 nm light, the light energy provided being at 75 J/cm$^2$ and at 25 J/cm$^2$, respectively. Thirdly, a 1:3 irradiance ratio of aBL to aPDT was applied, with 40 mW/cm$^2$ irradiance for the 405-nm light and 130 mW/cm$^2$ for the 810 nm light, the light energy applied being at 25 J/cm$^2$ and at 75 J/cm$^2$, respectively.

Colony-Forming-Unit Counting

Subsequent to the final light exposure of each experiment, the entire biofilm was removed from the well by collecting the broth together with the dense biofilm. The biofilm was then placed into a 1-ml test tube, forming 200 μl of suspension. After meticulous vortexing (Vortex Genie, Scientific Industries Inc, US), serial dilutions from 1:1 to 1:100 000 were done, using sterile ART filter tips (Thermo Scientific, Waltham, US). To enumerate the viable cells, 100 μl of resulting biofilm dilution was then evenly spread over an entire BHI plate, using a sterile L-shape rod.

The plates were then assembled into the incubator, the bacteria were grown for 48 h, and the plates were photographed (Canon D5 DSLR camera with Canon EF 24-70 mm f/4 L lens, Canon, Japan) on a light table (Artgraph Light Pad Revolution 80, Artograph Inc, US). Colony-forming units were assessed with Image J software (National Institute of Health, US). Typically, numbers between 30 and 800 were considered to be in the range where the data was statistically most reliable, and the number of bacterial colonies was calculated accordingly.

Statistical Analysis

Colony-forming-unit counts were compared with the non-parametric Mann-Whitney U-test, using GraphPad Prism 8 software (GraphPad Software, San Diego, US).

Results

Figure 2:
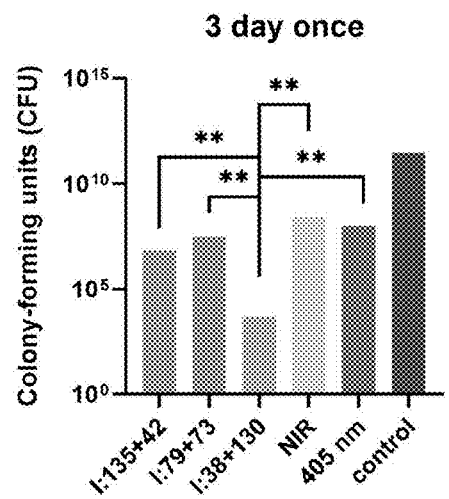
FIG. 2 is a bar chart showing the corresponding efficiency as FIG. 1 after three-day incubation.
Figure 3:
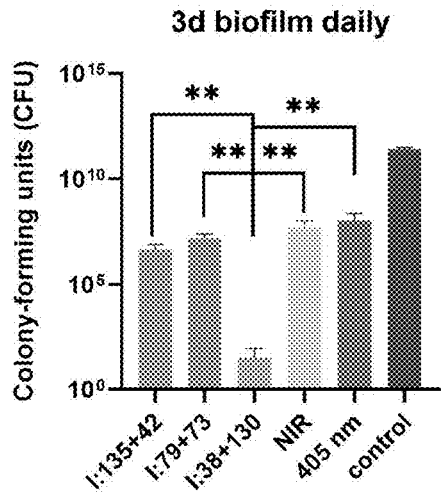
FIG. 3 is a bar chart showing of various light treatments on *Staphylococcus aureus* growth medium suspensions in terms of the count of colony-forming units after three-day incubation with repeated daily dosage.
Figure 4:
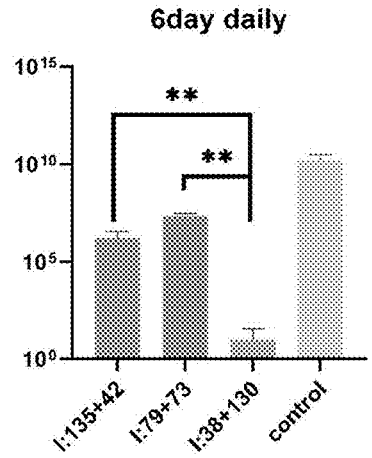
FIG. 4 is a bar chart showing the corresponding efficiency as in FIG. 3 but after six-day incubation with repeated daily dosage.

FIGS. 1 to 4 illustrate the results obtained by the tests. In the drawings, the six bars stand for the following (from left to right): first column: 1:3 aBL/aPDT ratio; second column: 1:1 aBL/aPDT ratio; third column: 3:1 aBL/aPDT ratio; fourth column: aPDT (810 nm); fifth column: 405 nm; and sixth column: control.

As will appear, on a one-day biofilm, dual-light aPDT was significantly more efficient than single-light aBL or aPDT, although all modalities were bactericidal.

On a three-day maturated biofilm, a single exposure of aPDT or dual-light aPDT was more efficient than aBL, resulting in a four logarithmic scale reduction in bacterial counts.

Surprisingly, a significant difference was observed between different dual-light relative energy rations where ¼ NIR to ¾ aBL was most effective.

The ¼ NIR and ¾ aBL ratio increased with antibacterial effectivity compared to 1/1 and ¾ NIR and ¼ aBL relative energy rations. The largest difference was observed in 6-day daily treated biofilm model.

This study demonstrates the efficacy of dual-light aPDT against *Staphylococcus aureus* biofilm. The simultaneous, synchronized application of an ICG/810-nm aPDT and 405-nm aBL resulted in a significantly improved antibacterial efficacy, when compared to single-light aPDT or aBL. Interestingly, the antibacterial effect was greatest, when the relative amount of aBL was increased up to two thirds of the total amount of light irradiance. Most importantly, the antibacterial effect

The invention claimed is:

1. A method for topical treatment of an infection caused by *Staphylococcus aureus* on a mammal, comprising the steps of:
    applying a photosensitizer to at least a part of a biological surface affected by the infection, and
    subjecting said part of the biological surface with the applied photosensitizer to first photons with a majority energy between 2.8 eV and 3.5 eV at a first energy level and second photons with a majority energy between 1.24 eV and 1.65 eV at a second energy level, the ratio between the first and the second energy levels being in the range from about 5:0.8 to 3.5:0.9.

2. The method according to claim 1, wherein:
    non-coherent radiant light energy is generated at two different energy levels: the first and the second energy level;
    from the non-coherent radiant light energy there is provided first light having a wavelength corresponding to the majority energy of the first energy level, and second light having a wavelength corresponding to the majority energy of the second energy level; and
    the first and second light are simultaneously directed against the biological surface.

3. The method according to claim 2, wherein the first light and the second light consist of the first light having the first photons with a majority energy between 2.8 eV and 3.5 eV; and the second light having the second photons with a majority energy between 1.24 eV and 1.65 eV.

4. The method according to claim 1, wherein the first photons and the second photons are emitted using feed-in voltage or current that is alternated or pulsed at 1 Hz to 1 GHz frequency independently from each other.

5. The method according to claim 1, comprising using an optoelectronic device having a plurality of semiconductor chips that are connected in series or in parallel, the chips exhibiting emission energy that can be varied in the range of 2.48 eV and 1.24 eV and in the range of 3.5 eV and 2.8 eV, respectively.

6. The method according to claim 1, wherein the photosensitizer is selected from a natural compound, a synthetic photosensitizer, or combinations thereof,
   wherein the natural compound is selected from the group consisting of hypericin, curcumin, phenalenone derivatives, cercosporin, psoralen, xanthotoxin, angelicin, alpha-terthienyl, phenylheptatriyne, THC, cannabidiol (CBD), and combinations thereof, and
   wherein the synthetic photosensitizer is selected from the group consisting of RB (Rose Bengal), porphyrin derivatives, curcumin derivatives, methylene blue, indocyanine green, erythrosine, phenalenone derivatives, fullerene derivatives, xanthene derivatives, and combinations thereof.

7. The method according to claim 1, wherein light energy is directed towards the biological surface at a first wavelength from 400 to 430 nm at a dosage of 1 to 750 J/cm$^2$ with a power density of from about 10 to about 2500 mW/cm$^2$ for a period of time from 0.5 s to 120 min, and at a second wavelength from 780 to 830 nm at a dosage of 1 to 750 J/cm$^2$ with a power density of from about 10 to about 2500 mW/cm$^2$ for a period of time from 0.5 s to 120 min.

8. The method according to claim 1, wherein the first and second photons are produced by one or several light-emitting diodes.

9. The method according to claim 1, wherein the photosensitizer is Indocyanine Green.

10. The method according to claim 1, comprising treating superficial skin infections caused by *Staphylococcus aureus* or comprising treating infections caused by *Staphylococcus aureus* on and in organs and organ tissues, superficial skin, skin tissues, body fluids, prosthetics and parts thereof and artificial tissues.

11. The method according to claim 1, comprising carrying out the topical treatment for a duration of 0.5 s to 120 min, 1 to 5 times a day, for 1 to 14 days.

12. The method according to claim 1, comprising carrying out the topical treatment for a duration of 0.5 s to 120 min, 2 to 50 times during 1 to 14 days.

13. A kit for topical treatment of an infection caused by *Staphylococcus aureus* on a mammal, comprising:
   an optoelectronic device configured for simultaneously emitting a first light comprising first photons with a majority energy between 2.8 eV and 3.5 eV at a first energy level and a second light comprising second photons with a majority energy between 1.24 eV and 1.65 eV at a second energy level, the ratio between the first and the second energy levels being in the range from about 5:0.8 to 3.5:0.9, and
   at least one photosensitizer which can be activated by either or both of the first photons and the second photons.

14. The kit according to claim 13, wherein the first and said second light amounts to at least 80% of all light emitted from the optoelectronic device.

15. The kit according to claim 13, wherein the optoelectric device is configured to emit two wavelengths simultaneously or at a time interval of 0.001 to 1000 ms, together with the photosensitizer for topical treatment of a skin infection on the skin of a mammal caused by *Staphylococcus aureus*.

16. The kit according to claim 13, wherein the photosensitizer is selected from a natural compound, a synthetic photosensitizer, or combinations thereof
   wherein the natural compound is selected from the group consisting of hypericin, curcumin, phenalenone derivatives, cercosporin, psoralen, xanthotoxin, angelicin, alpha-terthienyl, phenylheptatriyne, THC, cannabidiol (CBD), and combinations thereof, and
   wherein the synthetic photosensitizer is selected from the group consisting of RB (Rose Bengal), porphyrin derivatives, curcumin derivatives, methylene blue, indocyanine green, erythrosine, phenalenone derivatives, fullerene derivatives, xanthene derivatives, resveratrol, berry extracts, polyphenolic compounds, anthocyanin compounds and combinations thereof.

17. The kit according to claim 13, wherein the optoelectronic device is configured to emit non-coherent light, comprising:
   the first photons at a first wavelength from 400 to 430 nm, at a dosage of 1 to 750 J/cm$^2$, and a power density of from about 10 to about 2500 mW/cm$^2$ for a period of time from 0.5 s to 120 min, and
   the second photons at a second wavelength from 780 to 830 nm, at a dosage of 1 to 750 J/cm$^2$, and with a power density of from about 10 to about 2500 mW/cm$^2$ for a period of time from 0.5 s to 120 min.

18. The kit according to claim 13, wherein the optoelectronic device is configured to emit non-coherent light.

19. The kit according to claim 13, wherein the optoelectric device comprises light-emitting diode(s) as a light source.

* * * * *